(12) United States Patent
Aittamaa et al.

(10) Patent No.: US 6,559,348 B1
(45) Date of Patent: May 6, 2003

(54) PROCESS FOR TREATING GAS FLOWS OF POLYOLEFIN MANUFACTURING

(75) Inventors: Juhani Aittamaa, Helsinki (FI); Harri Järvelin, Helsinki (FI); Timo Nyman, Vantaa (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/623,363

(22) PCT Filed: Mar. 4, 1999

(86) PCT No.: PCT/FI99/00172
§ 371 (c)(1),
(2), (4) Date: Sep. 25, 2000

(87) PCT Pub. No.: WO99/45035
PCT Pub. Date: Sep. 10, 1999

(30) Foreign Application Priority Data

Mar. 4, 1998 (FI) .................................................. 980496

(51) Int. Cl.⁷ .................... C07C 7/144; B01D 53/22; B01D 171/40
(52) U.S. Cl. .................... 585/818; 585/802; 585/809; 95/50; 95/55; 203/39; 526/72; 526/90
(58) Field of Search .................... 526/90, 72; 585/802, 585/809, 818; 95/50, 55; 203/39

(56) References Cited

U.S. PATENT DOCUMENTS

| | | | |
|---|---|---|---|
| 4,235,983 A | * | 11/1980 | Steigelmann et al. ......... 526/68 |
| 4,740,550 A | | 4/1988 | Foster |
| 5,134,208 A | | 7/1992 | Burstain |

FOREIGN PATENT DOCUMENTS

| | | |
|---|---|---|
| EP | A2778293 | 6/1997 |
| JP | A8151413 | 6/1996 |
| WO | A1-9858975 | 12/1998 |

OTHER PUBLICATIONS

WPI/Derwent No. 96–329491 "Multi–Stage Polymerisation of Olefin—is carried out in presence of hydrogen where gas discharged from process is passed through hydrogen membrance before being passed back to polymiser" (1994).

* cited by examiner

Primary Examiner—Fred Teskin
(74) Attorney, Agent, or Firm—Birch, Stewart, Kolasch & Birch, LLP

(57) ABSTRACT

The invention relates to a process for the treatment of a gas stream obtained from the production of polyolefins and containing unreacted compounds. According to the process, uncondensed compounds are removed from the gas stream and, when so desired, these compounds are directed to further treatment. According to the invention, the uncondensed compounds are separated from the gas stream by membrane separation. Thus the separation of gases is facilitated, since by coupling the membrane system in conjunction with distillation columns the distillation can be carried out at a substantially higher top temperature. By using the membrane system it is possible effectively to remove the lightest gases, which would otherwise accumulate in the process.

20 Claims, 4 Drawing Sheets

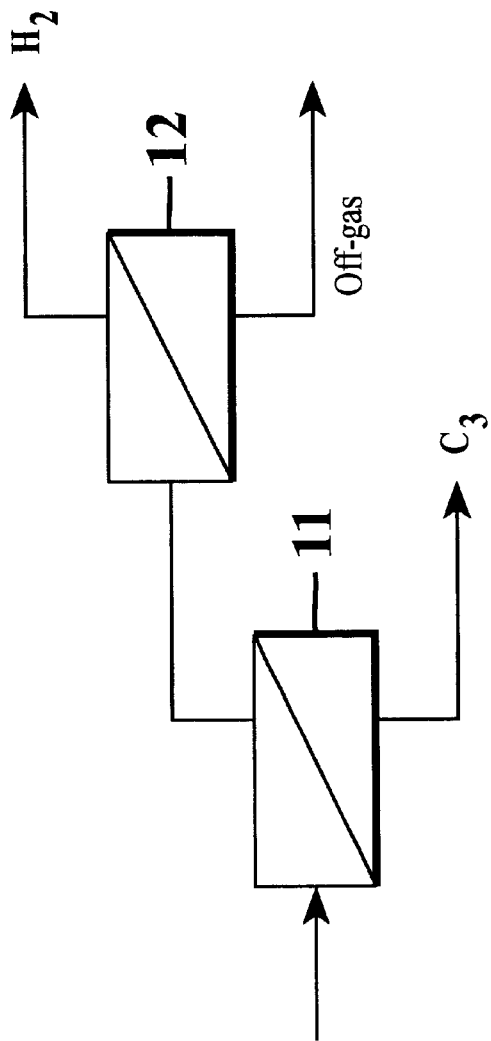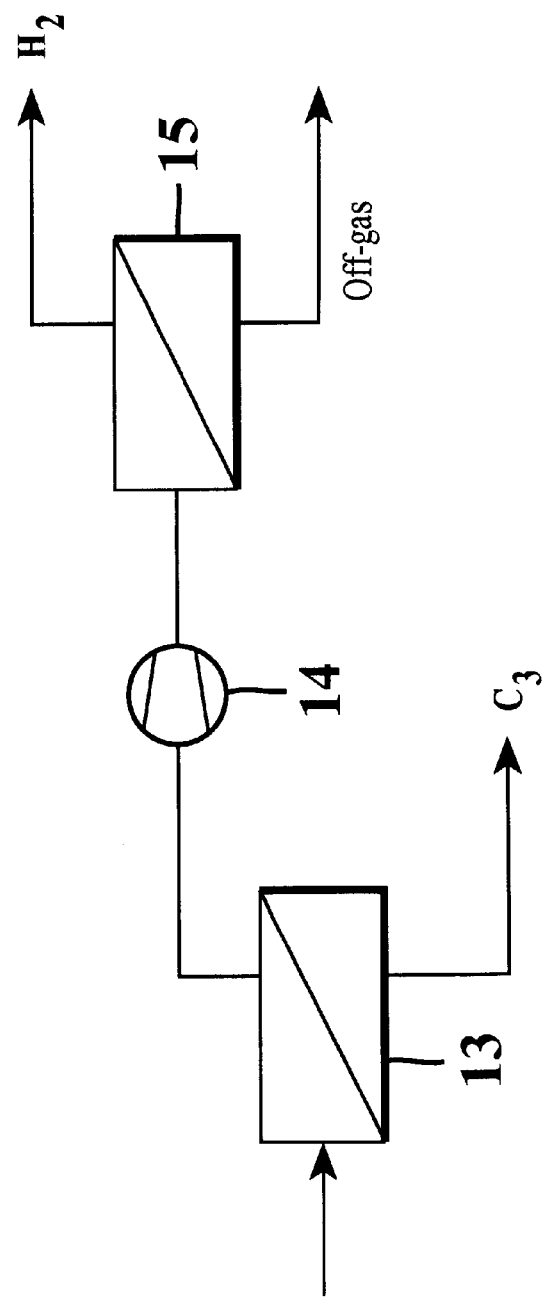

PROCESS FOR TREATING GAS FLOWS OF POLYOLEFIN MANUFACTURING

This application is the national phase under 35 U.S.C. §371 of PCT International Application No. PCT/FI99/00172 which has an international filing date of Mar. 4, 1999, which designated the United States of America.

The present invention relates to the preparation of polyolefins. The invention relates in particular to a process according to the preamble of claim 1 for the treatment of a gas stream obtained from the preparation of polyolefins and containing unreacted compounds. The said streams are obtained when α-olefins are polymerized in the presence of a catalyst in at least one reactor in order to form a reaction product which contains polyolefin. The reactor effluent is in this case directed to a separator, where the gas stream containing unreacted compounds is separated and the polymer product is recovered. The substantially uncondensed compounds are removed from the gas stream obtained from the separator and are directed to further treatment.

Olefins are polymerized to polyolefins in the presence of, for example, Ziegler-Natta type catalysts or metallocene catalysts. Loop reactors, fluidized-bed reactors, stirred gas-phase reactors, and fluidized-bed reactors provided with stirring members are examples of the reactor types used. The reactor contains a monomer (typically ethylene or propylene) and possibly a comonomer ($C_2$–$C_{10}$ olefins or diolefins, preferably ethylene, propylene, 1-butene or hexene) and hydrogen, which controls the molar mass distribution. The reactor may also contain high concentrations of a substance inert in terms of the reaction (typically nitrogen or propane).

It is typical of all of the reactors mentioned above that, together with the polymer obtained as a product there emerges from the reactor unreacted monomer, comonomer and often diluent (a substance inert in terms of the reaction).

The gases coming from the product separators of the reactors are mainly returned to the process; some are directed to the flare or for fuel gas. The gases may also be directed to distillation, if it is desired to divide the monomer, the comonomer and the diluent into separate streams for reuse. The problem involved in separation by distillation is that in the gas stream exiting from the reactors there are always also present byproducts of the reaction, heavy oligomers, and light hydrocarbons and hydrogen which have entered with the feed. These byproducts complicate polymerization in mainly two ways:

When they end up in the said distillation products (monomer, comonomer and diluent) they are recycled to the reactors, whereby their concentration in the reactor gradually increases. If such a situation continues for too long, the operation of the process is complicated to such an extent that it has to be interrupted and shut down. This in turn means a very great financial loss.

The accumulating inert compounds are as a rule light components. Since the separation of the gases is carried out by distillation, the temperature of the overhead product of the distillation column has to be lowered owing to the light components. In this case this leads to the situation that in the condenser of at least one overhead product of the distillation column it is not possible to use air or water, which are the most common and the least expensive condensing media.

In a typical plant producing polyolefins, a number of products having different comonomer concentrations and different molar mass distributions are prepared. These grade change situations regularly also change the composition of the gas exiting together with the product. In the following there are given a few principles of grade change situations:

1. When a shift is made to products differing in comonomer concentrations or when it is desired to change the monomer concentration in a circulation gas stream which contains inerts, grade change typically does not cause great problems. If it is desired to lower the concentration of the reactive component concerned, its feed is lowered or discontinued, and the reaction rather rapidly consumes the excess. If it is desired to increase the component concentrations concerned, the change usually has to be made relatively calmly so that a rapid change of the reaction conditions should not cause problems. Furthermore, the typical changes in the comonomer or monomer concentrations are rather small, and thus the changes can be carried out relatively smoothly. The hydrogen amounts used are typically rather small, and thus the increasing of the hydrogen amount is not a big problem.

2. The lowering of the hydrogen concentration is more difficult, since hydrogen is consumed practically not at all in the reaction. Nowadays the most common method of lowering the concentration of hydrogen in the reactor is to increase the exit stream of the accumulating inerts close to the maximum capacity of the gas removal system. The gas to be removed is directed, for example, to the flare for burning or as feed to cracking. When the amount of hydrogen of a relatively low concentration is being reduced, the gases exiting together with hydrogen will cause a great financial loss to the polyolefin plant.

Although the grade change situation is to be taken into account primarily in the operating of the reactors, it is clear that the concentration of the gas mixture exiting from the reactors together with the reactor product polymer varies. This variation complicates the planning and use of the gas separation unit.

As is evident from the foregoing, the accumulating light inert gases thus have to be removed from the polyolefin process. Usually it is done by directing, in connection with the gas separation distillation, the lightest components either to the flare, to the fuel gas network, or to the cracking unit feed. This exit gas stream also contains considerable amounts of components which should be recycled to the reactors, and therefore the conventional removal system is not a good solution. If the light gases are used as a fuel gas, the value of the stream is the combustion value of the components present in it. When they are directed to the flare, their value is virtually negative. If the light gases are directed as feed to the cracking unit, the cracking unit capacity, and thereby also the output of the plant, is lowered.

The object of the present invention is to eliminate the disadvantages associated with the prior art technology and to provide a completely new solution to the problem of treating the gas stream obtained from the polymerization of polyolefins.

The invention is based on the basic principle that hydrogen is separated from the gas stream of the gas-phase reactor by using a membrane system. The membranes are semipermeable films through which different gas molecules travel at different velocities. Thus it is possible to separate different components from one another. Separation based on membranes is in general advantageous in situations in which the substances treated have boiling points so low that the gas cannot be condensed by means of water or air, in which case this separation operation, important in the chemical process industry, becomes very expensive.

In connection with the present invention we have observed, surprisingly, that the placement of the membrane system in conjunction with distillation separators facilitates the separation of gases, and at the same time the operation of the entire polymerization process, and thereby also the profitability of the whole plant, is improved.

More specifically, the process according to the invention is characterized mainly by what is stated in the characterizing part of claim 1.

The invention comprises the use of a membrane separation apparatus for the separation of hydrogen from the hydrocarbon stream obtained from the polymerization reactor, the stream containing hydrogen and light, unreacted hydrocarbon compounds.

Considerable advantages are gained through the present invention. Thus, the separation of gases is facilitated, since by coupling the membrane system in conjunction with the distillation columns it is possible to carry out the distillation at a substantially higher top temperature. According to the invention the distillation column can be operated so that the temperature of the overhead product is 35° C. This means that the condensing of the overhead product can be carried out, for example, by using cooling water or air. Usually the distillation column is operated so that the overhead product of the column is cooled by using a so-called refrigerating machine. The temperature of the top of the column is in this case typically approx. −20° C. A prior art option such as this is quite expensive. If condensation with air or water is used, the uncondensed gas stream is very large, and its treatment is expensive and in all respects disadvantageous.

According to the invention, the separation of the gases also becomes more effective, since the use of the membrane system makes possible a better recovery of the monomer, comonomer and diluent. By using a membrane system it is possible effectively to remove the lightest gases, which would otherwise accumulate in the process.

The placement of the membrane system in conjunction with the distillation separators thus facilitates the separation of the gases and improves the operation of the entire polymerization process and thereby the profitability of the plant.

The invention will be examined below in greater detail with the help of a more detailed description and embodiment examples, with reference to the accompanying drawings.

BRIEF DESCRIPTION OF THE DRAWINGS

FIGS. 2 and 3 depict membrane systems by means of which the overhead product of the distillation system can be separated into three product streams.

Figure 1:
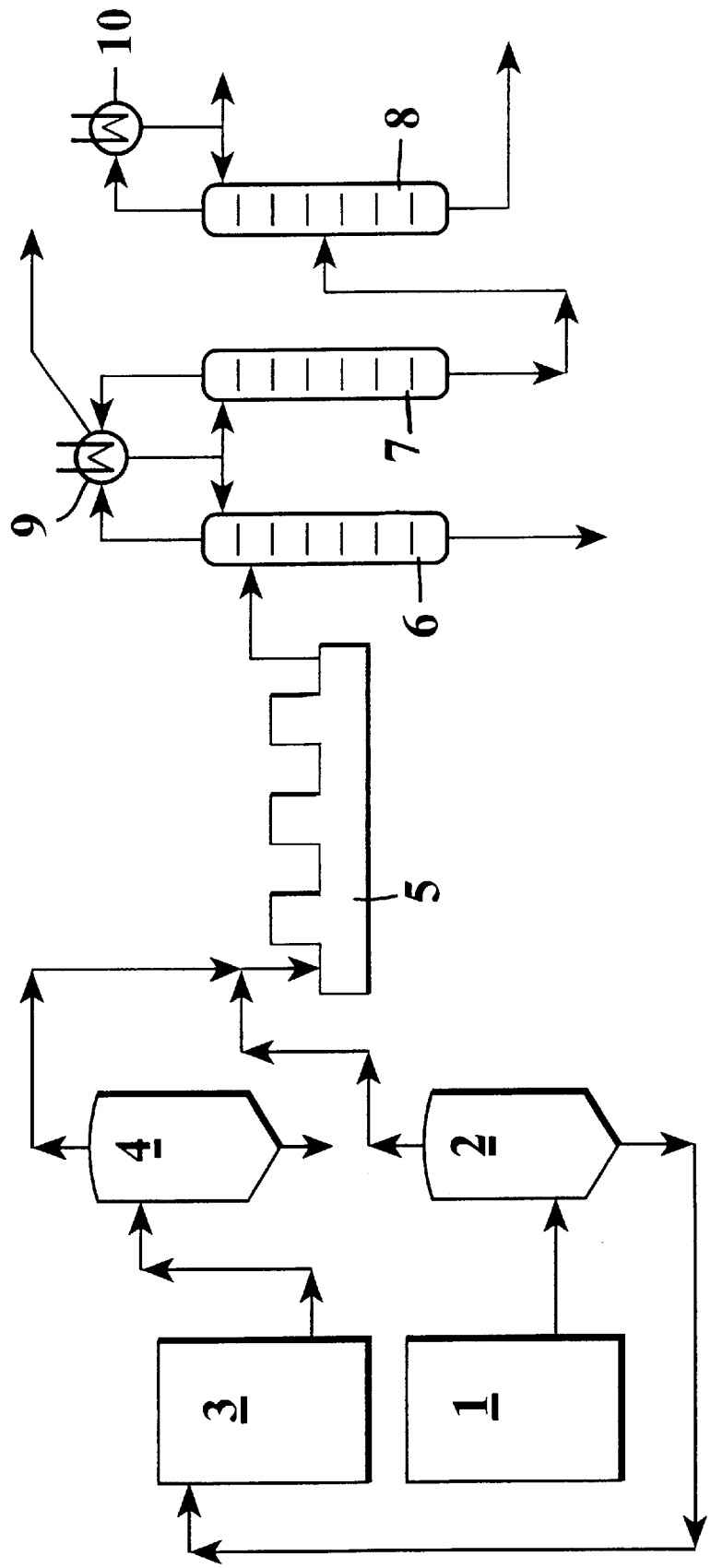
FIG. 1 depicts the principle of the circulation gas and recovery streams in a prior art system of two successive reactors, and the distillation-based separators in conjunction with them.

As stated above, the invention relates to a novel process for the preparation of polyolefins, in particular polyethylene and polypropylene, wherein the light gases and unreacted starting materials exiting together with the product obtained from one or more polymerization reactors are separated from the gas stream by using a membrane separation system. Examples of the light gases include hydrogen, and examples of unreacted starting materials include the monomer of the polymerization, possibly comonomers and the diluent (polymerization medium which is inert in the reaction).

The process according to the invention is suitable for use in the preparation of polyolefins, in particular polyethylene and polypropylene, in which case the polymerizable monomers are ethylene and propylene and the comonomers propylene and respectively ethylene, as well as, for example 1-butene, 4-methyl-1-pentene, 3-methyl-1-butene, vinylcyclohexane, cyclopentene, 1-hexene, 1-octene and 1-decene. In the polymerization reactors the medium may be in a liquid, vapor, gas or supercritical state and the polymers of olefins in an either solid or liquid state.

The polymerization reaction is usually carried out at elevated pressure and at an elevated temperature. Thus, for example, in bulk polymerization the pressure is approx. 30–100 bar and the temperature approx. 50–100° C. In gas-phase polymerization the pressure is approx. 10–40 bar and the temperature respectively approx. 60–110° C. The polymerization is typically carried out in the presence of a heterogeneous catalyst, in which case, for example, transition metal catalysts, such as Philips-type chromium catalysts, Ziegler-Natta catalysts or metallocene catalysts, are used in the preparation of polyethylene. Metallocene catalysts and Ziegler-Natta catalysts, e.g. $MgCl_2 * TiCl_4$ are also suitable for the polymerization of polypropylene.

According to the present invention, first an exit stream or effluent is withdrawn from the polymerization reactor and the gases are separated therefrom. Preferably the separation operation is carried out in the product separator of the reactor, for example in a flash tank, where the pressure of the exit stream is lowered, whereupon the light compounds vaporize and pass into the gas phase. The gaseous compounds may also be separated in the cyclone of the gas-phase reactor without substantially lowering the pressure.

The effluent of a reaction taking place in a liquid and supercritical fluid typically comprises the entire medium, the monomer and comonomer concentration in it being more than 60%, as well as hydrogen used for the control of the molar mass, or it also contains significant amounts of inert hydrocarbons (diluents). The major part of the effluent usually vaporizes when the pressure is lowered.

Corresponding gaseous compounds are obtained from the product separators of gas-phase reactors.

According to the invention, the gases are directed to a distillation column, where they are separated so that the monomer, the comonomer and the diluent form separate streams for reuse. The overhead product obtained from the reflux condenser or reflux drum of the distillation column, together with its uncondensed gases, is thereafter directed to a membrane system, where it can be divided into a hydrogen-containing stream and one or more hydrocarbon streams from which a substantial proportion of the hydrogen has been removed. To the membrane unit the uncondensed gases are directed via a heater. Heating is carried out in order to prevent condensation from occurring in the membrane unit.

The separated hydrogen can be directed for reuse to other process units where it is needed, or in an extreme case it can be burned in the flare. When most of the hydrogen has been removed, the hydrocarbon-containing stream can, when so desired, be condensed at least in part, and at least the condensed portion can be returned to the reactor cycle. From the uncondensed portion the light inerts can be removed and directed to the fuel gas network and to the flare.

The membranes used for the separation of gases can be classified into inorganic membranes, carbon fiber membranes, polymeric membranes and liquid membranes. All of these types can be used in the present invention. An example of inorganic membranes are ceramic membranes. Polymeric membranes constitute an especially advantageous option.

The functioning of liquid membranes is based on the different dissolving rates of the substances to be separated in the liquid membrane concerned. The stability of the liquid in a membrane is a problem, as is also the relatively low permeability, which leads to a large required mass transfer area and thereby a high price.

The polymer membranes usable in the invention can be further classified into two categories according to whether the polymer is in a rubbery or glassy state. By rubbery polymers is meant here amorphous polymers which are used at temperatures above their softening or glass transition temperatures. The mechanical properties of rubbery polymers can be improved by combining polymers, such as styrene-butadiene-styrene (SBS) or silicone-polycarbonate. Especially suitable for the separation of hydrogen and light hydrocarbons is silicone rubber, i.e. poly(dimethylsiloxane), PDMS; the selectivity and permeability values of membranes made of it are presented in the literature. The mechanical properties of the polymer can be improved by preparing copolymers from the material, for example siloxane-polyimide segment polymers.

Polyacetylene membranes are usually classified as glassy materials, and of them it is possible to use, for example, poly(1-(trimethylsilyl)-1-propene), PTMSP, for which selectivity and permeability values are also given in the literature. Substituted polyacetylene membranes can be prepared also from this membrane, for example, PtB poly(t-butylacetylene) and PFM poly(o-(trifluoromethyl) phenylacetylene). One further possible usable option is membranes prepared from polyvinyltrimethylsilane, PVTMS.

Polyimides are glassy membranes having good mechanical properties and heat resistance. Polyimides which can be used in this invention include PMDA, BPDA, BTDA, 6FDA, pp'-ODA, mp'-ODA, APAP, BAHF, BAPHF and BATPHF (acronyms and properties: Tanaka et. al. Permeability and permselectivity of gases in flourinated and non-flourinated polyimides, Polymer, 33 (1992), 3). From the above-mentioned polyimides it is possible to prepare numerous substituents which are, in accordance with their properties, usable in the process defined by the present invention.

Polyamides are also commonly used for the separation of light gases. For example, the following materials can be used in the present invention: IP/6F, TBI/SO$_2$, TBI/6F, PII/SO$_2$ and IP/SO$_2$ (acronyms and properties: Morisato et. al, Gas separation properties of aromatic polyamides containing hexafluoroisopropylidene groups, Journal of Membrane Science, 97 (1994).

Other glassy membrane materials include polyphenyloxide, bisphenol A polysulfone (PSF), tetramethylbisphenol A polysulfone (TMPSF), polycarbonates [bisphenol A polycarbonate (PC), tetramethylbisphenol A polycarbonate (TMPC), hexafluorobisphenol A polycarbonate (HFPC) and tetramethylhexafluorobisphenol A polycarbonate (TMHF-PC)], various grades of polyethylene, cellulose acetate, and copolymers of polytetrafluoroethylene and Teflon AF 2400.

Figure 4:
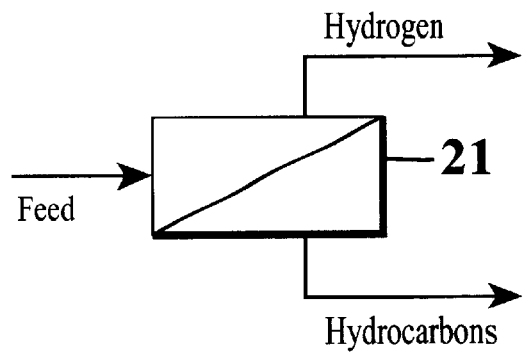
FIGS. 4 and 5 depict the principles of hydrocarbon-selective and hydrogen-selective membrane systems.
Figure 5:
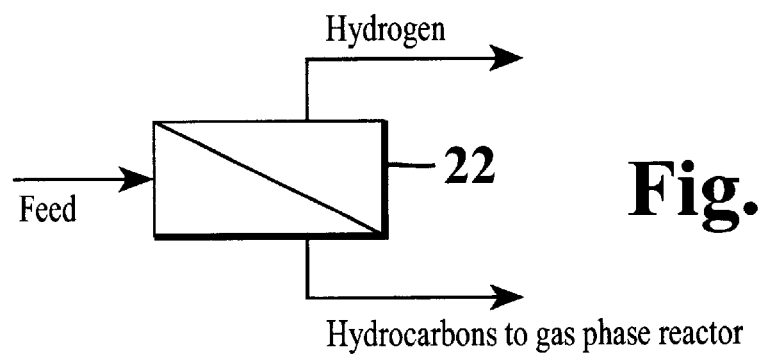

The functioning of the membrane system depends on the material from which it is made. When silicone rubber is used, the system which is the object of the invention functions so that the hydrocarbons present in the membrane unit feed travel more rapidly through the membrane, and hydrogen concentrates in the reject stream (i.e. in that portion which does not pass through the membrane). In this case the membrane is hydrocarbon selective. When other, for example glassy, materials are used, hydrogen concentrates in the permeate stream (i.e. in that portion which has passed through the membrane), thus the membrane is hydrogen selective. The principles of the membrane types are shown in FIGS. 4 and 5.

In the apparatus according to the invention, hydrogen and the lightest hydrocarbons are removed from the gas mixture emerging from a gas-phase reactor. The amount of hydrocarbons is considerably higher than that of hydrogen. Thus it is preferable to use a membrane system based on a hydrogen-selective membrane material. The use of polyamide, polysulfone and polyimide membranes is particularly advantageous, since their selectivity with respect to hydrogen is known to be good, and additionally their mechanical properties enable an advantageous membrane system to be made for this application.

The membrane systems are usually made up of a plurality of membrane modules. At the manufacturing stage there is usually formed from the membrane material either an even sheet or hollow fibers, which are packed into different module structures to produce a large material-transfer surface area. A module is a small and independent construction block in the membrane system, and it includes one or more membrane elements and flow spaces surrounding them. The membrane modules the most suitable for this application and for the separation of gases in general are hollow-fiber and spiral modules. The sheet-like membranes used for the spiral modules have in general higher permeability than have hollow-fiber membranes made from the same material, since it is difficult to make a fibrous material as thin as a sheet-like material. The advantage of hollow-fiber modules is their clearly lower manufacturing costs.

There may be a plurality of membrane separator modules in one and the same unit. They can be arranged parallel and/or in series. Each membrane separator unit has preferably 2–30 membrane separator modules.

Hydrogen-selective and hydrocarbon-selective membrane units can be combined together according to the needs of the process. The operation of a membrane unit can further be improved by using sweeping streams. The sweeping gas used is, for example, nitrogen, the polymerization diluent and/or monomer and/or comonomer. The retentate or permeate of another membrane unit is also usable. When there is an inert hydrocarbon, such as propane, on one side of a hydrogen-selective membrane, the partial pressure of hydrogen decreases and the amount of hydrogen to be separated increases.

Membrane separator units are typically operated at a temperature of 20–90° C. and a pressure of 0.5–5 MPa. However, these values do not represent any absolute limits for the process according to the invention. A temperature of −5 . . . 120° C., preferably approx. 20 . . . 60° C., and a pressure of 0.1 . . . 10 MPa, preferably approx. 0.7 . . . 4 MPa, can be generally defined as the operating range for membrane separator units. The pressure of the gas stream directed to the membrane can be increased in, for example, a compressor, before membrane separation in order to make the separation more effective.

Commercial membrane systems and their modules have been described in, for example, Handbook of Separation Process Technology (Ronald W. Rousseau Ed., Wiley-Interscience, John Wiley & Sons, New York 1987, 866–869).

FIG. 1 is a diagram of a polyolefin production process wherein the polymerization is carried out in two successive reactors. The first reactor used in the case according to the figure is a loop reactor 1, into which the catalyst and the monomers, and possibly a diluent, are fed. When necessary, also hydrogen is introduced into the reactor for controlling the molar mass of the polymer being prepared. From the reactor there is obtained an exit stream or effluent which contains polymer particles suspended in the reaction medium. The exit stream is directed to a product separator 2, where the pressure is lowered and the vaporizing gaseous compounds are recovered as the overhead of the reactor and the polymer is collected as the bottom product. The polymer is directed to a second reactor, which in the case according to FIG. 1 may be, for example, a gas-phase reactor 3, where the polymerization is continued by feeding in more monomer and, if necessary, more hydrogen. In the gas-phase reactor the olefins of the feed polymerize around catalyst particles, forming polyolefin particles.

From the bottom of the gas-phase reactor 3 there is withdrawn an exit stream (effluent) which contains a polymer, unreacted monomers, as well as hydrogen and other uncondensed gases. The pressure of the exit stream is lowered after the reactor, whereupon the unreacted monomers vaporize and pass into the gas phase. The exit stream is thereafter directed to a low-pressure separator 4, where the product polymer is separated from the gases. The gases may be recycled to the gas-phase reactor by means of a recovery compressor. The recycling option is not depicted in FIG. 1. In the process according to the figure the gases are directed to a gas recovery compressor 5. After compression the recovery gases are directed to a distillation column system 6–10, where those components which can be recycled into the process are separated from the gas stream. The overhead of the distillation columns is cooled in the overhead condenser 9, 10, and a portion is returned to the distillation. From the condenser the overhead is in this case usually first collected in a reflux drum (not shown), where uncondensable compounds can be separated from condensable compounds.

The uncondensable compounds, which include hydrogen and other light gases, are directed to a membrane separator system. FIGS. 2 and 3 depict different process configurations which are suited for the treatment of gaseous compounds.

FIG. 2 depicts a case in which the gases are first directed to a hydrocarbon-selective membrane module 11, where hydrocarbons travel more easily than hydrogen through the separation membrane. The obtained hydrocarbon stream, which contains $C_2$ and $C_3$ hydrocarbons can be combined with the reactor feed. In order to purify the hydrogen stream, the stream can be fed into a second membrane module 12, in which, for example, a hydrogen-selective membrane is used and hydrogen travels more easily than hydrocarbons through the separation membrane. The permeate obtained is a hydrogen stream which is sufficiently pure to be recycled into the polymerization process. The hydrocarbon stream obtained as the retentate, which in connection with PE and PP production contains, among other things, ethane and methane, can be directed to the flare, a cracking unit or the fuel gas network. There are components concentrated in the retentate, the accumulation of which components in the system is desired to be prevented.

FIG. 3 depicts an option in which the gases are directed through two successive hydrogen-selective membrane modules 13 and 15. Between the membranes the gas stream pressure is increased by using a compressor 14. The case according to FIG. 3 is applicable in particular to the separation and purification of hydrogen.

FIG. 4 depicts a hydrocarbon-selective membrane module or system 21, in which hydrocarbons travel more easily than hydrogen through the separator membrane, and FIG. 5 depicts a hydrogen-selective membrane module or system 22, in which hydrogen travels more easily than hydrocarbons through the separator membrane. The hydrogen-containing reject stream can be directed to hydrogen purification, combustion or the flare.

Figure 6:
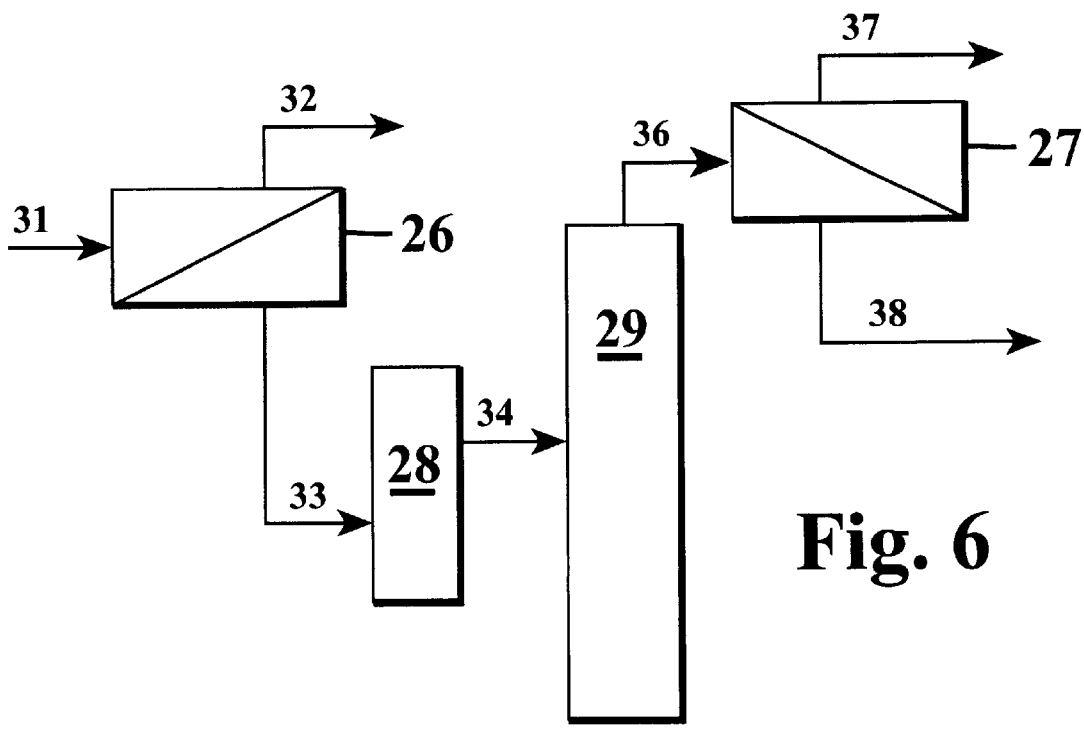
FIG. 6 depicts a combined membrane/distillation system, by means of which it is possible to separate the overhead of the distillation system into four product streams.

FIG. 6 depicts the process flow diagram which is the basis for computational examples 1 and 2. The process according to FIG. 6 is suitable, for example, for the treatment of recovery gases from the production of HDPE and LLDPE. The system corresponds largely to the case depicted in FIG. 2, wherein gases are treated in two membrane modules 26, 27 arranged in series, the membranes of both being hydrocarbon-selective. The pressure of the hydrocarbon stream obtained from the first membrane module is raised by using a blower 28, whereafter the product is fed into a separator (flash tank) 29, which may be provided with cooling. In the separator the hydrocarbon stream is divided into condensable and uncondensable compounds. The uncondensed, light hydrocarbons are directed to the second membrane module 27, where hydrogen is separated from the hydrocarbons. The process streams are numbered 31–38, and their compositions are given in Examples 1 and 2.

The membrane unit has been designed so that in the first membrane separation 26 there is separated a hydrogen-containing fraction (retentate), which can be recycled elsewhere in the polymerization process. The system can be implemented in such a manner that a large proportion of the hydrogen can be concentrated in the retentate stream, in which case the entire polyethylene plant can be constructed so that only hydrogen delivered in standard-size metal containers is required. Thereby a fixed connection with a hydrogen-producing unit, and thus also the construction of said unit, is avoided.

The bottom product obtained from the flash tank 29 is a stream which contains large amounts of ethylene and propane and which can be recycled into the polymerization process. The pressure of this stream is so high that it can be easily returned without the pressure being raised. The gas product from the flash tank is directed to the second membrane unit 27, in the retentate stream of which there are concentrated the impurities which have to be removed from the process owing to accumulation. These include hydrogen, methane and ethane. The special advantage gained from this option is that the stream to be removed from the process can be maintained small. The portion which travels through the membrane contains mainly ethylene and propane, and it can be recycled into the polymerization process. In known processes it is necessary to remove the accumulating impurities, for example, by directing a portion of the overhead to combustion. In this case considerably larger amounts of valuable components are removed together with the impurities, and these components can now be recycled into the process.

Figure 7:
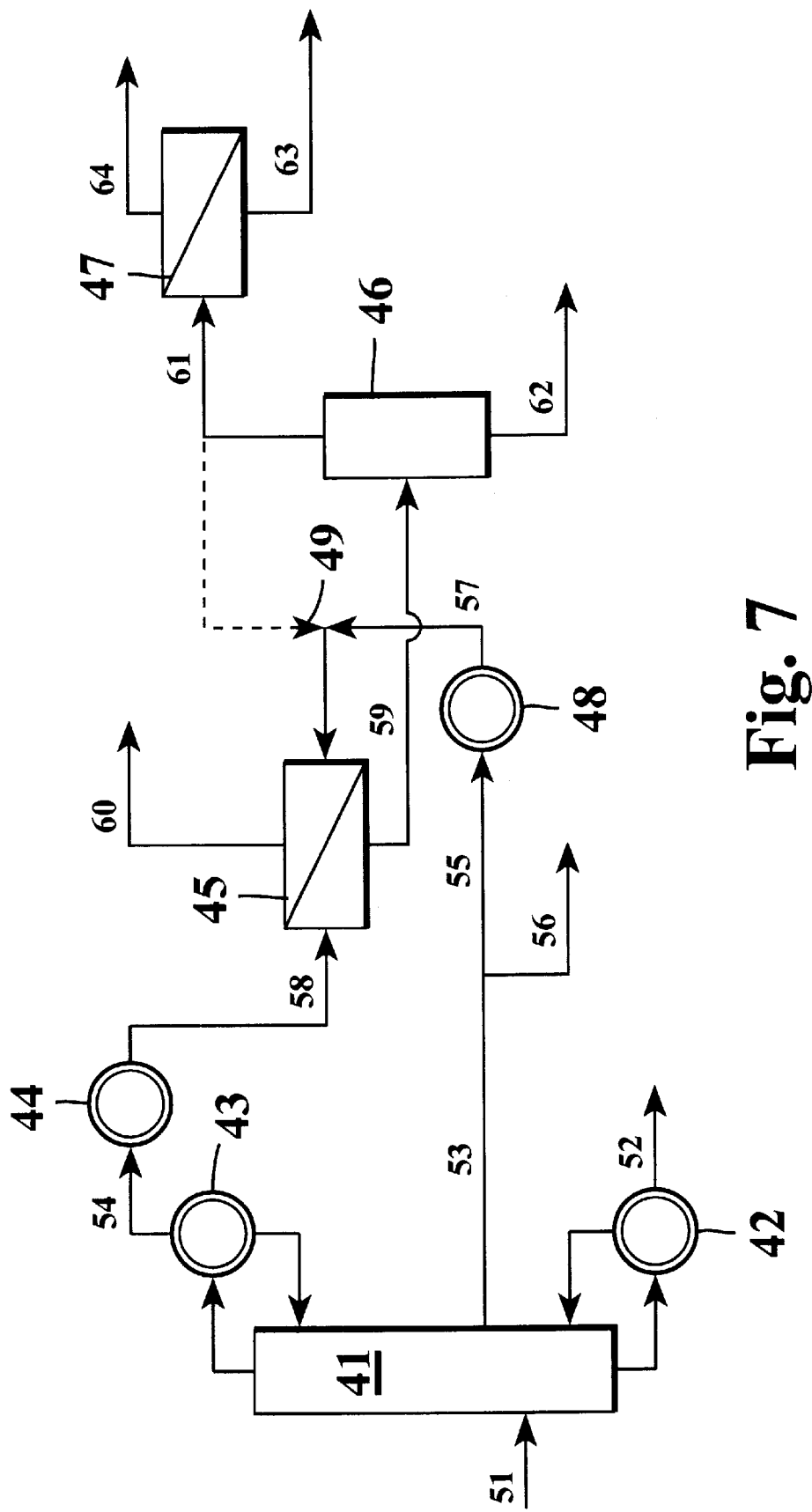
FIG. 7 depicts an apparatus option based on two membrane units; this is suitable in particular for the treatment of the gas stream obtained from the production of polypropylene.

FIG. 7 depicts the treatment of the recovery gases obtained from the gas-phase reactor of the polypropylene process. On the basis of the diagram there has been prepared a computational example 3, which examines the treatment of the recovery gases obtained from the polypropylene process.

In FIG. 7, reference numeral 41 indicates a distillation column to which the gases obtained from the process are directed. The column is equipped with a reboiler 42 and a condenser 43. The overhead from the column is directed to the condenser 43, from which a portion of the condensed compounds is returned to the column and the uncondensed compounds are directed further to the membrane unit. The heavy hydrocarbons, mainly $C_6$ and heavier, are withdrawn from the bottom of the column. The temperature of the overhead is raised, when necessary, in a heater 44, from which it is directed to the first membrane separator unit 45, which in this case is equipped with a hydrogen-selective membrane. Most of the hydrogen directed to the unit passes into the gaseous reject stream 60. The bottom product, i.e. the hydrocarbon stream, is directed to the flash tank 46, where its pressure is lowered. The condensing compounds of the hydrocarbon stream, i.e. primarily propylene, propane, methane and ethane, are recovered and recycled, and the uncondensed components, i.e. hydrogen, methane, ethane and propylene, are directed to the second membrane separator unit 47, where hydrogen is separated from the other components.

In the case according to FIG. 7, the first membrane separation is promoted by feeding to the permeate side as a sweeping gas a fraction obtained from the distillation column. Thus there is provided in the distillation column 41 a side drawoff (stream 53), which can be divided into two parts. One of these streams, the smaller stream (stream 55), from which the heavier components have been removed, is directed via a heater 48 and a three-way valve 49, as sweeping gas to the first membrane unit. The advantage gained from the use of sweeping gas is better separation in the membrane unit, since the partial pressure of hydrogen on the permeate side is lowered, whereupon the so-called driving force based on the concentration difference is greater and more hydrogen travels through the membrane. The sweeping gas used may also be retentate from the first membrane unit. The $C_3$ hydrocarbons (stream 56) obtained from the side drawoff can be recycled.

By using the process configuration described above, the hydrogen and inert hydrocarbons can be recovered effectively from the recovery gases of the polypropylene process and the olefin-containing streams can be rendered free of these components, whereupon the hydrocarbons can be recycled into the process.

The following computational examples illustrate the invention:

EXAMPLE 1

Treatment of Recovery Streams Obtained from HDPE Production

In Example 1, a recovery system according to FIG. 6 is calculated for the recovery gases obtained from the HDPE process. The hydrogen-selective membrane used in the membrane separator units 26 and 27 is a polyimide membrane and the hydrocarbon-selective membrane is silicone rubber.

The compositions of the various streams are shown in Table 1.

TABLE 1

Preparation of HD-PE

| Stream | 31 | 32 | 33 | 34 | 35 | 36 | 37 | 38 |
|---|---|---|---|---|---|---|---|---|
| Hydrogen | 15.79 | 12.32 | 3.48 | 3.48 | 0.67 | 2.81 | 0.69 | 2.11 |
| Methane | 11.70 | 0.48 | 11.22 | 11.22 | 4.74 | 6.49 | 2.01 | 4.48 |
| Ethylene | 296.73 | 3.15 | 293.58 | 293.58 | 183.34 | 110.25 | 54.99 | 55.26 |
| Ethane | 9.98 | 0.04 | 9.93 | 9.93 | 6.75 | 3.18 | 1.69 | 1.49 |
| Propane | 596.76 | 2.56 | 594.20 | 594.20 | 487.92 | 106.24 | 66.70 | 39.54 |
| 1-Butene | 2.33 | 0.01 | 2.32 | 2.32 | 2.09 | 0.24 | 0.17 | 0.07 |
| iso-Butene | 0.07 | 0.00 | 0.07 | 0.07 | 0.06 | 0.01 | 0.01 | 0.00 |
| cis-2-Butene | 0.02 | 0.00 | 0.02 | 0.02 | 0.02 | 0.00 | 0.00 | 0.00 |
| trans-2-Butene | 0.02 | 0.00 | 0.02 | 0.02 | 0.02 | 0.00 | 0.00 | 0.00 |
| n-Butane | 11.66 | 0.03 | 11.63 | 11.63 | 10.57 | 1.06 | 0.74 | 0.32 |
| iso-Butane | 17.68 | 0.04 | 17.65 | 17.65 | 15.71 | 1.93 | 1.35 | 0.58 |
| n-Hexane | 0.07 | 0.00 | 0.07 | 0.07 | 0.07 | 0.00 | 0.00 | 0.00 |
| Nitrogen | 12.20 | 1.07 | 11.13 | 11.13 | 2.67 | 8.46 | 1.27 | 7.19 |
| Mass flow | 975.00 | 19.68 | 955.32 | 955.32 | 714.61 | 240.68 | 129.61 | 111.07 |

EXAMPLE 2

Treatment of Recovery Streams Obtained from LLDPE Production

Recovery gases obtained from the production of LLDPE (Gas-phase reactor) are treated using a system according to diagram 6. The results and the compositions of the streams are shown in Table 2. The membranes used are a polyimide membrane (hydrogen-selective membrane) and a silicone rubber membrane (hydrocarbon-selective membrane).

TABLE 2

Preparation of LLD-PE

| Stream | 31 | 32 | 33 | 34 | 35 | 36 | 37 | 38 |
|---|---|---|---|---|---|---|---|---|
| Hydrogen | 6.10 | 4.51 | 1.60 | 1.60 | 0.18 | 1.42 | 0.35 | 1.07 |
| Methane | 6.95 | 0.35 | 6.60 | 6.60 | 1.97 | 4.64 | 1.45 | 3.19 |

TABLE 2-continued

Preparation of LLD-PE

| Stream | 31 | 32 | 33 | 34 | 35 | 36 | 37 | 38 |
|---|---|---|---|---|---|---|---|---|
| Ethylene | 200.35 | 2.72 | 197.63 | 197.63 | 100.31 | 97.36 | 550.08 | 47.28 |
| Ethane | 7.96 | 0.04 | 7.92 | 7.92 | 4.53 | 3.39 | 1.86 | 1.53 |
| Propane | 435.19 | 2.40 | 432.79 | 432.79 | 326.68 | 106.03 | 69.40 | 36.63 |
| 1-Butene | 11.76 | 0.03 | 11.73 | 11.73 | 10.10 | 1.63 | 1.19 | 0.44 |
| iso-Butene | 0.40 | 0.00 | 0.40 | 0.40 | 0.34 | 0.06 | 0.04 | 0.02 |
| cis-2-Butene | 0.08 | 0.00 | 0.08 | 0.08 | 0.07 | 0.01 | 0.01 | 0.00 |
| trans-2-Butene | 0.08 | 0.00 | 0.08 | 0.08 | 0.07 | 0.01 | 0.01 | 0.00 |
| n-Butene | 8.73 | 0.02 | 8.71 | 8.71 | 7.63 | 1.08 | 0.79 | 0.29 |
| iso-Butane | 13.60 | 0.04 | 13.57 | 13.57 | 11.54 | 2.03 | 1.48 | 0.54 |
| n-Hexane | 0.07 | 0.00 | 0.07 | 0.07 | 0.07 | 0.00 | 0.00 | 0.00 |
| Nitrogen | 4.71 | 0.49 | 4.23 | 4.23 | 0.62 | 3.61 | 0.53 | 3.08 |
| Mass flow | 696.00 | 10.60 | 685.40 | 685.40 | 464.10 | 221.25 | 127.18 | 94.07 |

EXAMPLE 3

Treatment of Recovery Streams Obtained from PP Production

Recovery streams obtained from the production of PP (gas-phase reactor) are treated using a system according to diagram 7. The membranes used are as in Examples 1 and 2. The compositions of the streams are shown in Table 3.

What is claimed is:

1. A process for the treatment of a gas stream obtained from a light gas distillation column of a polymerization reactor or from a reflux drum of the column used in the production of polyolefins and containing unreacted compounds, according to which process uncondensed compounds are separated from the gas stream by membrane separation and are optionally directed to further treatment, comprising

TABLE 3

| Stream No. | 51 | 52 | 53 | 54 | 55 | 56 | 57 |
|---|---|---|---|---|---|---|---|
| Stream name | DA2FD | 71 | 78 | LGHT | C3PURE | C3REC | C3-SGAS |
| Pressure, MPa | 2.30 | 2.20 | 2.20 | 2.20 | 2.20 | 2.20 | 0.50 |
| Temperature, °C. | 75.60 | 81.40 | 50.20 | 35.30 | 50.20 | 50.20 | 80.00 |
| Mass flow, kg/h | 5270 | 17 | 3720 | 1530 | 150 | 3570 | 150 |
| Component mass flow, kg/h | | | | | | | |
| H2 | 25.00 | 0.00 | 0.33 | 24.60 | 0.01 | 0.32 | 0.01 |
| CH4 | 5.65 | 0.00 | 0.32 | 5.43 | 0.01 | 0.30 | 0.01 |
| Ethane | 3.47 | 0.00 | 0.78 | 2.68 | 0.03 | 0.75 | 0.03 |
| Propylene | 4770.00 | 5.63 | 3350.00 | 1410.00 | 135.00 | 3220.00 | 135.00 |
| Propane | 405.00 | 0.72 | 322.00 | 82.10 | 13.00 | 309.00 | 13.00 |
| i-Butane | 50.00 | 0.73 | 48.80 | 0.51 | 1.96 | 46.80 | 1.96 |
| n-Hexane | 2.38 | 1.94 | 0.44 | 0.00 | 0.02 | 0.42 | 0.02 |
| n-Nonane | 2.030 | 2.020 | 0.005 | 0.000 | 0.000 | 0.004 | 0.000 |
| n-Dodecane | 2.000 | 2.000 | 0.000 | 0.000 | 0.000 | 0.000 | 0.000 |
| n-Pentadecane | 2.000 | 2.000 | 0.000 | 0.000 | 0.000 | 0.000 | 0.000 |
| n-Octadecane | 2.000 | 2.000 | 0.000 | 0.000 | 0.000 | 0.000 | 0.000 |
| N2 | 0.018 | 0.000 | 0.000 | 0.017 | 0.000 | 0.000 | 0.000 |

| Stream No. | 58 | 59 | 60 | 61 | 62 | 63 | 64 |
|---|---|---|---|---|---|---|---|
| Stream name | ME1-FD | C3FRAC | H2C3 | FL1-GAS | FL1-LIQ | OFFGAS | ME2-C3 |
| Pressure, MPa | 2.20 | 2.20 | 0.50 | 2.00 | 2.00 | 2.00 | 0.50 |
| Temperature, °C. | 65.00 | 65.00 | 65.00 | 42.00 | 42.00 | 42.00 | 42.00 |
| Mass flow, kg/h | 1530 | 1490 | 189 | 143 | 1350 | 32 | 112 |
| Component mass flow, kg/h | | | | | | | |
| H2 | 24.60 | 0.59 | 24.10 | 0.47 | 0.12 | 0.31 | 0.15 |
| CH4 | 5.34 | 4.79 | 0.56 | 2.18 | 2.61 | 1.30 | 0.88 |
| Ethane | 2.68 | 2.66 | 0.06 | 0.50 | 2.15 | 0.16 | 0.34 |
| Propylene | 1410.00 | 1400.00 | 148.00 | 133.00 | 1270.00 | 28.60 | 105.00 |
| Propane | 82.10 | 81.40 | 13.70 | 6.92 | 74.50 | 1.33 | 5.59 |
| i-Butane | 0.51 | 0.51 | 1.96 | 0.02 | 0.49 | 0.00 | 0.02 |
| n-Hexane | 0.00 | 0.00 | 0.02 | 0.00 | 0.00 | 0.00 | 0.00 |
| n-Nonane | 0.000 | 0.000 | 0.000 | 0.000 | 0.000 | 0.000 | 0.000 |
| n-Dodecane | 0.000 | 0.000 | 0.000 | 0.000 | 0.000 | 0.000 | 0.000 |
| n-Pentadecane | 0.000 | 0.000 | 0.000 | 0.000 | 0.000 | 0.000 | 0.000 |
| n-Octadecane | 0.000 | 0.000 | 0.000 | 0.000 | 0.000 | 0.000 | 0.000 |
| N2 | 0.017 | 0.013 | 0.004 | 0.009 | 0.005 | 0.008 | 0.001 | treating the gas stream directed to membrane separation with two membrane separation units arranged in series, the light hydrocarbons being separated and recovered in one unit and hydrogen being separated and recovered in the other unit.

2. The process according to claim 1, further comprising separating a first gas stream from effluent of a polymerization reactor used for the production of polyolefins, which first gas stream is distilled in a light-gas distillation column, and from the distillation column or its reflux drum is withdrawn a second gas stream, which second gas stream is directed to a first membrane separation unit, where hydrogen is separated therefrom.

3. The process according to claim 1, further comprising separating solids from the gas stream to be treated by membrane separation.

4. The process according to claim 1, further comprising treating the gas stream directed to membrane separation in two membrane separation units arranged in series, the light hydrocarbons being separated and recovered in the first unit and hydrogen being separated and recovered in the second unit.

5. The process according to claim 1, further comprising treating the gas stream directed to membrane separation in two membrane separation units arranged in series, hydrogen being separated and recovered in the first unit and hydrocarbons being separated and recovered in the second unit.

6. The process according to claim 1, wherein hydrogen-selective membrane separation is carried out in the first and the second membrane separation units.

7. The process according to claim 1, wherein hydrocarbon-selective membrane separation is carried out in the first membrane separation unit and a hydrogen-selective membrane separation is carried out in the second unit.

8. The process according to claim 1, wherein hydrocarbon-selective membrane separation is carried out in the first and the second membrane separation units.

9. The process according to claim 1, wherein pressure of a gas stream obtained from the first membrane separation unit is raised before entering the second membrane separation unit.

10. The process according to claim 1, wherein the membrane separation is performed with a membrane separation unit comprising a plurality of membrane separator modules.

11. The process according to claim 1, wherein the plurality of membrane separator modules is arranged in series, in parallel or in series and in parallel.

12. The process according to claim 10 or 11, wherein the membrane separation unit has 2–30 membrane separator modules.

13. The process according to claim 1, wherein the separated hydrogen from the second unit is recycled to the production of polyolefins.

14. The process according to claim 1, further comprising obtaining substantially hydrogen-free effluent from the membrane separation unit and directing said substantially hydrogen-free effluent to a flare or to a fuel gas network.

15. The process according to claim 1, further comprising obtaining substantially hydrogen-free effluent from the membrane separation unit and recycling by directing said substantially hydrogen-free effluent to the production of polyolefins.

16. The process according to claim 1, wherein the membrane separation units comprise membranes comprising polyamide, polyimide or silicone rubber.

17. The process according to claim 1, wherein the membrane separation units are operated at a temperature of −5 to 120° C. and under a pressure of 0.1 to 10 MPa.

18. The process according to claim 10, further comprising directing a sweeping gas to a permeate side of the membrane separator modules in order to promote membrane separation.

19. The process according to claim 18, wherein the sweeping gas is nitrogen, polymerization diluent, monomer or comonomer.

20. The process according to claim 18, wherein the membrane separation units are operated at a temperature of 20 to 60° C. and under a pressure of 0.7 to 4 MPa.

* * * * *